US008404009B2

(12) United States Patent
Suzuki et al.

(10) Patent No.: US 8,404,009 B2
(45) Date of Patent: Mar. 26, 2013

(54) POLISHING COMPOSITION FOR HARD DISK SUBSTRATE

(75) Inventors: Masahiko Suzuki, Wakayama (JP); Kenichi Suenaga, Wakayama (JP); Makoto Suzuki, Wakayama (JP)

(73) Assignee: Kao Corporation, Tokyo (JP)

( * ) Notice: Subject to any disclaimer, the term of this patent is extended or adjusted under 35 U.S.C. 154(b) by 888 days.

(21) Appl. No.: 12/259,904

(22) Filed: Oct. 28, 2008

(65) Prior Publication Data

US 2009/0111359 A1    Apr. 30, 2009

(30) Foreign Application Priority Data

| Oct. 29, 2007 | (JP) | 2007-280862 |
| Dec. 27, 2007 | (JP) | 2007-337482 |
| Dec. 28, 2007 | (JP) | 2007-341301 |
| May 30, 2008 | (JP) | 2008-143257 |

(51) Int. Cl.
  *B24D 3/02* (2006.01)
  *C09C 1/68* (2006.01)
  *C09K 3/14* (2006.01)

(52) U.S. Cl. .......... 51/307; 51/298; 51/308; 451/36

(58) Field of Classification Search .......... 51/298, 51/308; 451/36
See application file for complete search history.

(56) References Cited

U.S. PATENT DOCUMENTS

| 4,356,107 A * | 10/1982 | Payne ............... 51/308 |
| 6,261,476 B1 * | 7/2001 | Kwok et al. .......... 252/79.1 |
| 6,340,374 B1 * | 1/2002 | Kato et al. ............ 51/308 |
| 6,896,591 B2 | 5/2005 | Chaneyalew et al. |
| 7,163,448 B2 * | 1/2007 | Hattori et al. .......... 451/57 |
| 7,204,936 B2 * | 4/2007 | Kitayama et al. ....... 252/79.1 |
| 2003/0041526 A1 * | 3/2003 | Fujii et al. ............. 51/307 |
| 2003/0110711 A1 | 6/2003 | Ota et al. |
| 2004/0025742 A1 * | 2/2004 | Kitayama et al. ........ 51/307 |
| 2004/0157535 A1 | 8/2004 | Chaneyalew et al. |
| 2004/0235396 A1 * | 11/2004 | Hattori et al. .......... 451/41 |
| 2005/0139119 A1 | 6/2005 | Rader et al. |

(Continued)

FOREIGN PATENT DOCUMENTS

| CN | 1427025 A | 7/2003 |
| CN | 1693406 A | 11/2005 |

(Continued)

OTHER PUBLICATIONS

Japanese Office Action for Application No. 2007-341301 dated Mar. 13, 2012 (with English translation).

(Continued)

*Primary Examiner* — Kaj K Olsen
*Assistant Examiner* — Ross J Christie
(74) *Attorney, Agent, or Firm* — Birch, Stewart, Kolasch & Birch, LLP

(57) ABSTRACT

A polishing composition for a hard disk substrate includes alumina particles, silica particles, and water. The volume median diameter of secondary particles of the alumina particles measured by a laser beam diffraction method is 0.1 to 0.8 μm. The volume median diameter of primary particles of the silica particles measured by transmission electron microscope observation is 40 to 150 nm. The standard deviation in number-basis particle size of the primary particles of the silica particles measured by the transmission electron microscope observation is 11 to 35 nm. The polishing composition for a hard disk substrate can preferably reduce the embedding of alumina abrasive grains into the substrate without impairing the productivity.

9 Claims, 1 Drawing Sheet

U.S. PATENT DOCUMENTS

| | | |
|---|---|---|
| 2005/0139803 A1 | 6/2005 | Uno et al. |
| 2005/0145879 A1* | 7/2005 | Nakayama et al. ............ 257/103 |
| 2005/0233097 A1* | 10/2005 | Tojo et al. .................. 428/32.26 |
| 2006/0037251 A1* | 2/2006 | Kurata et al. .................... 51/298 |
| 2007/0149097 A1* | 6/2007 | Fujii et al. ........................ 51/309 |
| 2007/0243710 A1* | 10/2007 | Yi et al. ......................... 438/692 |

FOREIGN PATENT DOCUMENTS

| | | |
|---|---|---|
| GB | 2 410 030 A | 7/2005 |
| GB | 2 410 250 A | 7/2005 |
| JP | 9-204657 A | 8/1997 |
| JP | 3253228 B2 | 11/2001 |
| JP | 2002-30274 A | 1/2002 |
| JP | 2003-297777 A | 10/2003 |
| JP | 2004-253058 A | 9/2004 |
| JP | 2007321159 A | 12/2007 |
| WO | WO 2006125462 A1 * | 11/2006 |

OTHER PUBLICATIONS

Decision of Rejection for corresponding Japanese Patent Application No. 2007-341301, dated Jul. 17, 2012.
Notification of the First Office Action for corresponding Chinese Patent Application No. 200810173817.3, dated Oct. 9, 2012.

* cited by examiner

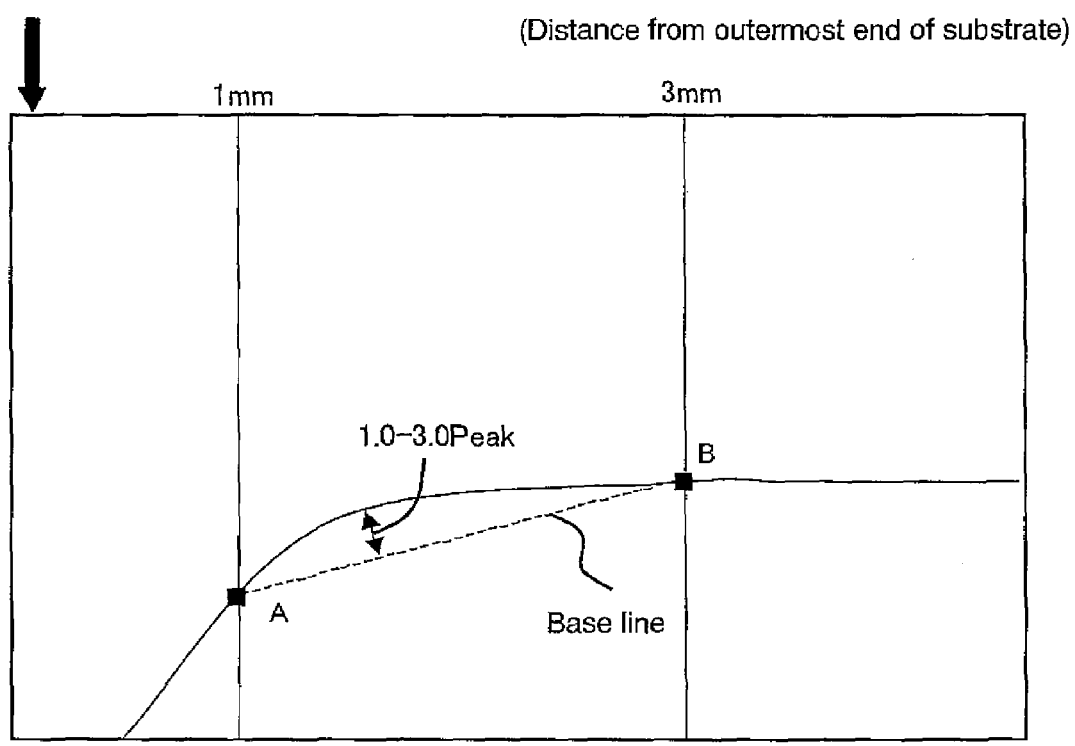

POLISHING COMPOSITION FOR HARD DISK SUBSTRATE

FIELD OF THE INVENTION

The present invention relates to a polishing composition for a hard disk substrate, a polishing method using the polishing composition, and a method for manufacturing a hard disk substrate using the polishing composition.

BACKGROUND OF THE INVENTION

With the rapid widespread use of computers and the start-up of digital broadcasting or the like, there have been demands for a hard disk drive with a higher capacity and a smaller diameter. For example, as a method for increasing the recording density of a memory hard disk used in the hard disk drive, it has been proposed that the unit recording area is decreased by lowering the flying height of a magnetic head. However, in order to lower the flying height of the magnetic head, the surface roughness, micro-waviness, etc. of the surface of a hard disk substrate should be correspondingly reduced. To meet these requirements, abrasive slurry capable of improving the surface characteristics of a substrate after polishing has been known (e.g., JP 2005-186269, JP 2006-518549, and JP 2007-168034).

In terms of improving both the productivity and the surface quality such as better smoothness and higher resistance to scratches, a method for manufacturing the hard disk substrate usually employs a multistage polishing system that includes two or more stages of polishing. In the final polishing process, i.e., the finish polishing process of the multistage polishing system, the substrate is generally polished with a finish polishing composition using colloidal silica particles so as to reduce the surface roughness and scratches. On the other hand, a polishing process (also referred to as a rough polishing process) prior to the finish polishing process is likely to use abrasive grains that have a relatively large particle size and can achieve a high polishing rate, e.g., alumina particles in terms of productivity.

SUMMARY OF THE INVENTION

A polishing composition for a hard disk substrate of the present invention includes alumina particles, silica particles, and water. The volume median diameter of secondary particles of the alumina particles measured by a laser beam diffraction method is 0.1 to 0.8 µm. The volume median diameter of primary particles of the silica particles measured by transmission electron microscope observation is 40 to 150 nm. The standard deviation in number-basis particle size of the primary particles of the silica particles measured by the transmission electron microscope observation is 11 to 35 nm. A method for manufacturing a hard disk substrate of the present invention includes polishing a substrate to be polished with the polishing composition for a hard disk substrate of the present invention. In this manufacturing method, a polishing pressure during the polishing is 10.3 to 16.7 kPa. A method for polishing a substrate to be polished of the present invention includes polishing the substrate to be polished with the polishing composition for a hard disk substrate of the present invention. In this polishing method, the substrate to be polished is used for manufacturing a hard disk substrate for a perpendicular magnetic recording system, a polishing pressure during the polishing is 10.3 to 16.7 kPa, and the polishing process is a rough polishing process.

BRIEF DESCRIPTION OF THE DRAWINGS

FIG. 1 is a cross-sectional view of a substrate showing the points at which 1.0-3.0 Peak roll-off was measured in Examples of the present invention.

DETAILED DESCRIPTION OF THE INVENTION

In the polishing composition for a hard disk substrate, when alumina particles are used as abrasive grains, a defect occurs in the medium due to texture scratches caused by the embedding of the alumina particles into the substrate. This in turn leads to a reduction in the magnetic characteristics, namely a lower signal noise ratio (SNR). The above conventional technique cannot sufficiently suppress the embedding of the alumina particles into the substrate.

With the need for a larger recording capacity, the hard disk recording system is shifting from a longitudinal magnetic recording system to a perpendicular magnetic recording system. In the manufacturing process of a hard disk for the perpendicular magnetic recording system, a magnetic layer is formed without undergoing texture processing that has been employed in the longitudinal magnetic recording system. Therefore, the embedding of the alumina particles that occurs during the polishing process of the substrate cannot be reduced by texture processing, and thus it is expected that the SNR will decrease significantly.

The present invention is based on the findings that the embedding of the alumina particles into the substrate can be significantly reduced after polishing by using alumina particles having a specific secondary particle size with silica particles having a broad particle size distribution and a specific primary particle size as abrasive grains of the polishing composition. Although the mechanism of reducing the embedding of the alumina particles remains unclear, the use of the silica particles having a broad particle size distribution, i.e., a large standard deviation in particle size may increase the packing ratio of the silica particles, thereby increasing friction between the abrasive grains and the substrate to be polished. As a result, the alumina particles penetrating into the substrate are pulled out, and the embedding of the alumina particles into the substrate may be reduced accordingly. Moreover, the present invention is based on the findings that the above combination of two types of abrasive grains also can preferably reduce the waviness of the substrate after polishing.

In one aspect, the present invention relates to a polishing composition for a hard disk substrate that includes alumina particles, silica particles, and water. The volume median diameter of secondary particles of the alumina particles measured by a laser beam diffraction method is 0.1 to 0.8 µm. The volume median diameter of primary particles of the silica particles measured by transmission electron microscope observation is 40 to 150 nm. The standard deviation in number-basis particle size of the primary particles of the silica particles measured by the transmission electron microscope observation is 11 to 35 nm. By using the polishing composition for a hard disk substrate of the present invention (also referred to as the polishing composition of the present invention in the following), a hard disk substrate suitable for a high recording density, particularly for a perpendicular magnetic recording system can be preferably provided while reducing the embedding of the alumina particles into the substrate without impairing the productivity (e.g., the polishing rate). According to the polishing composition of the present invention, the waviness also can be reduced further.

In the present invention, the term "embedding" of the alumina particles indicates a state in which the alumina particles are embedded into and remain in the substrate. Such embedding of the alumina particles into the substrate causes a defect in the medium and a reduction in the magnetic characteristics. As will be described in Examples, the embedding can be evaluated by slightly polishing the substrate surface with the polishing composition including the silica particles as abrasive grains, removing the abrasive grains adhered to the substrate, and then observing the substrate surface with a dark-field microscope, an atomic force microscope (AFM), or a scanning electron microscope (SEM). Reducing the embedding of the alumina particles into the substrate can suppress a decrease in the SNR and improve the surface characteristics of the substrate.

In the present invention, the term "waviness" of the substrate indicates unevenness of the substrate surface having a longer wavelength than roughness. The waviness has a wavelength of 0.5 to 5 mm in this specification. Reducing the waviness of the substrate can lower the flying height of the magnetic head and improve the recording density of the magnetic disk substrate.

[Alumina Particles]

The polishing composition of the present invention includes alumina particles serving as abrasive grains. In terms of reducing the embedding, the waviness, and the surface roughness, improving the polishing rate, and preventing surface defects, the alumina particles used in the present invention are preferably alumina with a purity of 95% or more, more preferably 97% or more, and even more preferably 99% or more. In terms of improving the polishing rate, α-alumina is preferred. In terms of enhancing the surface properties of the substrate and reducing the waviness, intermediate alumina and amorphous alumina are preferred. The intermediate alumina is a generic term used to describe crystalline alumina particles other than the α-alumina. Specifically, the intermediate alumina may include γ-alumina, δ-alumina, θ-alumina, η-alumina, κ-alumina, and a mixture thereof. Among them, in terms of improving the polishing rate and reducing the waviness, the γ-alumina, the δ-alumina, the θ-alumina, and a mixture thereof are preferred, and the γ-alumina and the θ-alumina are more preferred. In terms of improving the polishing rate and reducing the waviness, it is preferable to use a mixture of the α-alumina, the intermediate alumina, and/or the amorphous alumina, more preferable to use a mixture of the α-alumina and the intermediate alumina, and even more preferable to use a mixture of the α-alumina and the θ-alumina. In terms of improving the polishing rate and reducing the waviness, the α-alumina content in the alumina particles is preferably 20 to 100% by weight, more preferably 20 to 80% by weight, and even more preferably 20 to 75% by weight. In the present invention, the α-alumina content in the alumina particles is determined such a manner that the peak area of the 104 plane of WA-1000 (alumina particles produced by SHOWA DENKO K.K.) is identified as 100%, and relatively compared to the corresponding peak area of α-alumina in X-ray diffraction.

When the α-alumina, the intermediate alumina, and/or the amorphous alumina are mixed, the weight ratio of the α-alumina to the intermediate alumina and/or the amorphous alumina (i.e., the weight of α-alumina/the weight of intermediate alumina and/or amorphous alumina) is preferably 90/10 to 10/90, more preferably 85/15 to 40/60, and even more preferably 80/20 to 50/50 in terms of reducing the roll-off, improving the polishing rate, and reducing the waviness.

The volume median diameter of the secondary particles of the alumina particles used in the present invention is measured by a laser beam diffraction method. In terms of reducing the embedding, the waviness, and the surface roughness, the volume median diameter is 0.8 μm or less, preferably 0.6 μm or less, more preferably 0.5 μm or less, and even more preferably 0.4 μm or less. In terms of improving the polishing rate, the volume median diameter is 0.1 μm or more, preferably 0.15 μm or more, more preferably 0.2 μm or more, and even more preferably 0.25 μm or more. Accordingly, the volume median diameter is 0.1 to 0.8 μm, preferably 0.15 to 0.6 μm, more preferably 0.2 to 0.5 μm, and even more preferably 0.25 to 0.4 μm. Particularly, in terms of reducing the embedding, the waviness, and the surface roughness and improving the polishing rate, the volume median diameter of the secondary particles of the α-alumina measured by the laser beam diffraction method is preferably 0.1 to 0.8 μm, more preferably 0.15 to 0.6 μm, even more preferably 0.2 to 0.5 μm, and much more preferably 0.25 to 0.4 μm.

In terms of reducing the embedding and the surface contamination, the volume median diameter of the primary particles of the alumina particles is preferably 0.005 to 0.5 μm, more preferably 0.01 to 0.4 μm, even more preferably 0.03 to 0.3 μm, and much more preferably 0.05 to 0.2 μm. Particularly, in terms of improving the polishing rate and reducing the embedding and the surface contamination, the volume median diameter of the primary particles of the α-alumina is preferably 0.05 to 0.5 μm, more preferably 0.05 to 0.4 μm, even more preferably 0.05 to 0.3 μm, and much more preferably 0.07 to 0.2 μm. The volume median diameter of the primary particles of the alumina particles can be determined by analyzing the scanning electron microscope images (preferably 3000 to 30000× magnification) or the transmission electron microscope images (preferably 10000 to 300000× magnification). Specifically, using enlarged photographs or the like, the maximum diameter of each of the primary particles is measured for at least 200 particles. Then, the volume of a sphere whose diameter is the maximum diameter is calculated, and a particle size ($D_{50}$) at which the cumulative volume frequency of the primary particles from a smaller particle size side reaches 50% is defined as the volume median diameter of the primary particles.

In terms of improving the polishing rate and reducing the embedding, the content of the alumina particles in the polishing composition is preferably 0.05% or more by weight, more preferably 0.1% or more by weight, even more preferably 0.5% or more by weight, and much more preferably 1% or more by weight. In terms of improving the surface quality and the cost effectiveness, the content of the alumina particles is preferably 30% or less by weight, more preferably 20% or less by weight, even more preferably 15% or less by weight, and much more preferably 10% or less by weight. Accordingly, the content of the alumina particles in the polishing composition is preferably 0.05 to 30% by weight, more preferably 0.1 to 20% by weight, even more preferably 0.5 to 15% by weight, and much more preferably 1 to 10% by weight.

In terms of reducing the embedding, the content of coarse particles with a particle size of 1 μm or more in the alumina particles is preferably 0.2% or less by weight, more preferably 0.15% or less by weight, even more preferably 0.1% or less by weight, and much more preferably 0.05% or less by weight. In the same terms as described above, the content of coarse particles with a particle size of 3 μm or more in the alumina particles is preferably 0.05% or less by weight, more preferably 0.04% or less by weight, even more preferably 0.03% or less by weight, much more preferably 0.02% or less by weight, and further preferably 0.01% or less by weight. The "coarse particles with a particle size of 1 μm or more" or the "coarse particles with a particle size of 3 μm or more"

include not only the primary particles, but also the secondary particles formed by aggregation of the primary particles. A sizing particle optical sensing method is used to measure the content of the coarse particles in the polishing composition. Specifically, the content of the coarse particles can be determined by measuring the particle size of the alumina particles with "Accusizer 780" manufactured by Particle Sizing Systems Inc. The method for controlling the content of the coarse particles with a particle size of 1 μm or more in the alumina particles is not particularly limited, and a general dispersion method or particle removal method may be used during or after production of the polishing composition.

[Silica Particles]

The polishing composition of the present invention includes silica particles along with the alumina particles as abrasive grains. The silica particles can be colloidal silica, fumed silica, surface-modified silica, etc. Among them, colloidal silica is preferred, since it is suitable for the final/finish polishing of a substrate for a high recording density memory magnetic disk that requires improved smoothness. The colloidal silica particles can be obtained, e.g., by a method for producing them from a silicate aqueous solution.

In terms of reducing the embedding, improving the polishing rate, and reducing the waviness, the volume median diameter (also referred to as a volume-basis average particle size ($D_{50}$)) of the primary particles of the silica particles used in the present invention is 40 to 150 nm, preferably 45 to 100 nm, and more preferably 50 to 80 nm. In terms of reducing the embedding, improving the polishing rate, and reducing the waviness, the standard deviation in number-basis particle size of the silica particles is 11 to 35 nm, preferably 15 to 30 nm, and more preferably 18 to 25 nm.

The volume median diameter and the standard deviation in number-basis particle size of the primary particles of the silica particles can be determined in the following manner. First, the silica particles are observed with a transmission electron microscope (TEM) ("JEM-2000FX", 80 kV, 10000-50000× manufactured by JEOL Ltd.), and the TEM images are photographed and scanned into a personal computer as image data using a scanner. Then, the diameter of a circle having the same area as the projected area of each silica particle is calculated for at least 1000 silica particle data with analysis software "WinROOF" (commercially available from Mitani Corporation). Using the resultant diameters of the individual silica particles, the standard deviation (sample standard deviation) in number-basis particle size is determined with spreadsheet software "EXCEL" (manufactured by Microsoft Corporation). Moreover, based on the silica particle size distribution data obtained by converting the particle diameter into a particle volume with the spreadsheet software "EXCEL", the proportion (% by volume) of the particles having a specific particle size in the whole particles is expressed as a cumulative frequency from a smaller particle size side, thereby providing the cumulative volume frequency (%). Based on the particle size and the cumulative volume frequency data of the silica particles thus determined, the cumulative volume frequency is plotted against the particle size, so that a graph of particle size versus cumulative volume frequency is obtained. In this graph, a particle size at which the cumulative volume frequency of the silica particles from the smaller particle size side reaches 50% is defined as the volume median diameter of the silica particles.

In terms of reducing the embedding, improving the polishing rate, and reducing the waviness, the silica particles preferably include silica particles with a particle size of 20 to 120 nm in an amount of 40% or more by volume, more preferably 60% or more by volume, even more preferably 80% or more by volume, and much more preferably 90% or more by volume of the total amount of the silica particles.

In terms of reducing the embedding, improving the polishing rate, and reducing the waviness, it is preferable that in the particle size ranges of 20 to 40 nm, 60 to 80 nm, and 100 to 120 nm, the volume percentage of the silica particles with a particle size of 60 to 80 nm is the largest. It is also preferable that the silica particles with a particle size of 20 to 40 nm are included in an amount of 1 to 40% by volume of the total amount of the silica particles, the silica particles with a particle size of 60 to 80 nm are included in an amount of 5 to 90% by volume of the total amount of the silica particles, and the silica particles with a particle size of 100 to 120 nm are included in an amount of 0 to 40% by volume of the total amount of the silica particles.

In the same terms as described above, the content of the silica particles with a particle size of 20 to 40 nm is more preferably 1 to 30% by volume, and even more preferably 1 to 25% by volume of the total amount of the silica particles. The content of the silica particles with a particle size of 60 to 80 nm is more preferably 10 to 70% by volume, and even more preferably 20 to 60% by volume of the total amount of the silica particles. The content of the silica particles with a particle size of 100 to 120 nm is more preferably 0 to 30% by volume, and even more preferably 0 to 20% by volume of the total amount of the silica particles.

Based on the particle size distribution data as described above, the particle size distribution of the silica particles is obtained by calculating the proportion (% by volume) of the silica particles having a particle size of 20 to 120 nm, 20 to 40 nm, 60 to 80 nm, and 100 to 120 nm in the whole silica particles, respectively.

In terms of reducing the roll-off and the waviness of the substrate surface after polishing, the content of the silica particles with a particle size of 10 nm or less is preferably 0.1 to 25% by volume, more preferably 0.2 to 20% by volume, even more preferably 0.3 to 17% by volume, much more preferably 0.4 to 15% by volume, and particularly preferably 0.5 to 10% by volume. If the polishing composition includes silica particles with a significantly smaller particle size than that Of the alumina particles serving as abrasive grains, it can reduce both the roll-off of the substrate and the waviness of the substrate surface after polishing.

The method for adjusting the particle size distribution of the silica particles is not particularly limited. For example, in the case of colloidal silica, the particle size distribution may be adjusted, e.g., by adding particles that are to be new nuclei in the process of generation and growth of the particles during their production so that a final product is allowed to have a particle size distribution, or by mixing two or more types of silica particles having different particle size distributions. For ease of adjustment, mixing two or more types of silica particles having different particle size distributions is preferred.

In terms of improving the polishing rate and reducing the roll-off and the embedding, it is preferable that the silica particles include silica particles with a shape factor SF-1 (representing the particle roundness) of 130 to 180, preferably 130 to 175, and more preferably 130 to 170. In the present invention, the shape factor SF-1 represents the particle roundness and indicates a value obtained by dividing the area of a circle whose diameter is the maximum diameter of an abrasive particle observed with an electron microscope by the projected area of this abrasive particle observed with the electron microscope and multiplying the result by 100 (see Japanese Patent No. 3253228). Although the electron microscope is not particularly limited, e.g., a transmission electron microscope (TEM) or a scanning electron microscope (SEM) can be used.

The particle shape is closer to a sphere as SF-1 is closer to 100. Therefore, the silica particles with SF-1 in the above range deviate from the roundness of a sphere. If the polishing composition includes the alumina particles serving as abrasive grains and the silica particles including a predetermined amount of particles that deviate from the roundness of a sphere, it can reduce the roll-off of the substrate after polishing and the embedding of the alumina particles into the substrate.

In terms of improving the polishing rate and reducing the roll-off and the embedding, the content of the silica particles with SF-1 in the above range is 20% or more by weight, preferably 20 to 100% by weight, more preferably 50 to 100% by weight, and even more preferably 80 to 100% by weight of the total amount of the silica particles included in the polishing composition.

In terms of improving the polishing rate and reducing the roll-off and the embedding, the content of the silica particles with SF-1 in the above range in the silica particles included in the polishing composition is preferably 20% or more by number, more preferably 20 to 100% by number, even more preferably 50 to 100% by number, and much more preferably 80 to 100% by number. The number percentage of the silica particles with SF-1 in the above range in the silica particles included in the polishing composition is determined by counting the number of silica particles having a SF-1 value in the above range among 100 silica particles used to calculate the SF-1 value.

The silica particles with the shape factor SF-1 (representing the particle roundness) in the above range can be obtained either by hydrothermally treating known silica monodisperse particles or sol at a high concentration, or by adding a binder component to the silica monodisperse particle dispersion or sol and heat-treating the resultant mixture so that the monodisperse particles are bound together.

In terms of reducing the embedding of the alumina particles, improving the polishing rate, and reducing the waviness, the content of the silica particles in the polishing composition is preferably 0.1% or more by weight, more preferably 0.5% or more by weight, even more preferably 1.0% or more by weight, and much more preferably 1.5% or more by weight. In terms of improving the surface quality and the cost effectiveness, the content of the silica particles is preferably 30% or less by weight, more preferably 25% or less by weight, even more preferably 20% or less by weight, and much more preferably 15% or less by weight. Accordingly, the content of the silica particles in the polishing composition is preferably 0.1 to 30% by weight, more preferably 0.5 to 25% by weight, even more preferably 1 to 20% by weight, and much more preferably 1.5 to 15% by weight.

In terms of reducing the embedding of the alumina particles, improving the polishing rate, and reducing the waviness, the weight ratio of the alumina particles to the silica particles (alumina weight/silica weight) in the polishing composition is preferably in the range of 60/40 to 10/90, more preferably in the range of 50/50 to 15/85, and even more preferably in the range of 40160 to 20/80.

[Acid and/or its Salt]

In terms of improving the polishing rate and reducing the waviness, the polishing composition of the present invention preferably includes an acid and/or its salt. In terms of improving the polishing rate and reducing the embedding and the waviness, pK1 of the acid used in the present invention is preferably 7 or less, more preferably 5 or less, even more preferably 3 or less, and much more preferably 2 or less. In this specification, pK1 represents the logarithm of the reciprocal of a first acid dissociation constant (25° C.). The pK1 of each compound is described, e.g., in "Handbook of Chemistry (Basic) II", 4th ed., Chemical Society of Japan, pp. 316-325.

Specific examples of the acid and/or its salt used in the present invention are described below. Examples of inorganic acids include monovalent mineral acids such as nitric acid, hydrochloric acid, perchloric acid, and amidosulfonic acid; polyvalent mineral acids such as sulfuric acid, sulfurous acid, phosphoric acid, pyrophosphoric acid, polyphosphoric acid, phosphonic acid, and phosphinic acid; and salts of these acids. Examples of organic acids include monocarboxylic acids such as formic acid, acetic acid, glycolic acid, lactic acid, propanoic acid, hydroxypropane acid, butyric acid, benzoic acid, and glycine; polycarboxylic acids such as oxalic acid, succinic acid, glutaric acid, adipic acid, maleic acid, fumaric acid, itaconic acid, malic acid, tartaric acid, citric acid, isocitric acid, phthalic acid, nitrilotriacetic acid, and ethylenediaminetetraacetic acid; alkylsulfonic acids such as methanesulfonic acid and para-toluenesulfonic acid; alkylphosphoric acids such as ethyl phosphoric acid and butyl phosphoric acid; organophosphonic acids such as phosphonohydroxyacetic acid, hydroxyethylidene diphosphonic acid, phosphonobutanetricarboxylic acid, and ethylenediaminetetramethylenephosphonic acid; and salts of these acids. Among them, in terms of improving the polishing rate and reducing the embedding and the waviness, polyacids and their salts are preferred. More preferably, the polyvalent mineral acids, the polycarboxylic acids, the organophosphonic acids, and their salts are used. Even more preferably, the polyvalent mineral acids, the polycarboxylic acids, and their salts are used. In this case, the polyacid is an acid having more than one hydrogen that can produce a hydrogen ion in the molecule. In terms of preventing the surface contamination of the object to be polished, the nitric acid, the sulfuric acid, the alkylsulfonic acid, the polycarboxylic acid, and their salts are preferred.

The above acids may be used individually, but preferably used in combinations of two or more. In particular, when a metal surface such as a Ni—P plated substrate is polished, the elution of a metal ion in the object to be polished may occur during polishing and raise the pH of the polishing composition, making it impossible to achieve a high polishing rate. In order to reduce such a pH change, it is preferable to combine the acid with pK1 of less than 2.5 and the acid with pK1 of 2.5 or more, and more preferable to combine the acid with pK1 of 1.5 or less and the acid with pK1 of 2.5 or more. For the polishing composition including two or more of these acids, in terms of availability as well as improving the polishing rate and reducing the waviness, the mineral acids such as nitric acid, sulfuric acid, phosphoric acid, and polyphosphoric acid or the organophosphonic acids are preferably used as the acid with pK1 of less than 2.5. On the other hand, as the acid with pK1 of 2.5 or more, the organic carboxylic acids such as acetic acid, succinic acid, malic acid, tartaric acid, maleic acid, citric acid, and itaconic acid are preferred, particularly the succinic acid, the malic acid, the tartaric acid, the maleic acid, the citric acid, and the itaconic acid are preferred, and the citric acid is more preferred in the same terms as described above. In terms of improving the polishing rate and reducing the waviness, when the organic carboxylic acids with pK1 of 2.5 or more are used, it is more preferable to combine a hydroxycarboxylic acid and a polycarboxylic acid having two or more valences. For example, the hydroxycarboxylic acid can be a citric acid, a malic acid, a tartaric acid, or the like and the polycarboxylic acid can be a succinic acid, a maleic acid, an itaconic acid, or the like. Therefore, it is preferable to combine one or more types of acids selected from each of the groups, particularly to combine the citric acid and the polycarboxylic acid.

The salts of the above acids are not particularly limited, and specifically may be salts of the acids with metals, ammonium, alkylammonium, organic amine, etc. Specific examples of the metals include the metals belonging to Group 1A, 1B, 2A, 2B, 3A, 3B, 4A, 6A, 7A or 8 of the periodic table (long-period form). Among them, the salts of the acids with the metals of Group 1A or ammonium are preferred in terms of improving the polishing rate and reducing the roll-off.

In terms of improving the polishing rate, suppressing the roll-off, and preventing caking of the polishing composition, the polishing composition also may include an inorganic acid salt. Examples of the inorganic acid salt include ammonium nitrate, ammonium sulfate, potassium sulfate, nickel sulfate, aluminum nitrate, aluminum sulfate, and ammonium sulfamate.

In terms of improving the polishing rate and reducing the waviness, the content of the acid and/or its salt in the polishing composition is preferably 0.05% or more by weight, more preferably 0.1% or more by weight, even more preferably 0.3% or more by weight, and much more preferably 0.5% or more by weight. In terms of improving the surface quality and the cost effectiveness, the content of the acid and/or its salt is preferably 20% or less by weight, more preferably 15% or less by weight, even more preferably 10% or less by weight, and much more preferably 5% or less by weight. Accordingly, the content of the acid in the polishing composition is preferably 0.05 to 20% by weight, more preferably 0.1 to 15% by weight, even more preferably 0.3 to 10% by weight, and much more preferably 0.5 to 5% by weight. In terms of improving the polishing rate, the weight ratio of the acid with pK1 of less than 2.5 to the acid with pK1 of 2.5 or more [(acid with pK1 of less than 2.5)/(acid with pK1 of 2.5 or more)] is preferably 9/1 to 1/9, more preferably 7/1 to 1/7, and even preferably 5/1 to 1/5.

[Oxidizing Agent]

In terms of improving the polishing rate and reducing the embedding and the waviness, the polishing composition of the present invention preferably includes an oxidizing agent. Examples of the oxidizing agent used in the present invention include a peroxide, a peroxoacid of a metal or its salt, and an oxyacid or its salt. The oxidizing agent is classified broadly into an inorganic oxidizing agent and an organic oxidizing agent by the structure. Examples of the inorganic oxidizing agent include the following: a hydrogen peroxide; peroxides of an alkali metal or alkaline-earth metal such as sodium peroxide, potassium peroxide, calcium peroxide, barium peroxide, and magnesium peroxide; peroxocarbonates such as sodium peroxocarbonate and potassium peroxocarbonate; peroxosulfuric acids or salts thereof such as ammonium peroxodisulfate, sodium peroxodisulfate, potassium peroxodisulfate, and peroxomonosulfuric acid; peroxophosphoric acids or salts thereof such as sodium peroxophosphate, potassium peroxophosphate, and ammonium peroxophosphate; peroxoborates such as sodium peroxoborate and potassium peroxoborate; peroxochromates such as sodium peroxochromate and potassium peroxochromate; permanganates such as sodium permanganate and potassium permanganate; halogen-containing oxyacid salts such as sodium perchlorate, potassium perchlorate, sodium hypochlorite, sodium periodate, potassium periodate, sodium iodate, and potassium iodate; and inorganic acid metal salts such as iron (III) chloride, iron (III) sulfate, and aluminum nitrate. Examples of the organic oxidizing agent include the following: percarboxylic acids such as peracetic acid, performic acid, and perbenzoic acid; peroxides such as t-butylperoxide and cumene peroxide; and organic acid iron (III) such as iron (III) citrate. Among them, in terms of improving the polishing rate, the availability, and the ease of handling such as solubility in water, the inorganic oxidizing agent is preferred. In particular, the hydrogen peroxide, the sodium peroxoborate, the sodium iodate, and the potassium iodate are preferred. These oxidizing agents may be used individually or in combinations of two or more.

In terms of improving the polishing rate and reducing the embedding and the surface contamination, the content of the oxidizing agent in the polishing composition is preferably 0.1% or more by weight, more preferably 0.3% or more by weight, even more preferably 0.5% or more by weight, and much more preferably 0.8% or more by weight. In terms of reducing the roll-off and improving the surface quality, the content of the oxidizing agent is preferably 10% or less by weight, more preferably 5% or less by weight, even more preferably 3% or less by weight, and much more preferably 1.5% or less by weight. Accordingly, the content of the oxidizing agent in the polishing composition is preferably 0.1 to 10% by weight, more preferably 0.3 to 5% by weight, even more preferably 0.5 to 3% by weight, and much more preferably 0.8 to 1.5% by weight.

[Water]

The water included in the polishing composition of the present invention is used as a medium, and can be distilled water, ion-exchanged water, ultrapure water, etc. In terms of the handling properties (viscosity) of the polishing composition, the content of water in the polishing composition is preferably 55% or more by weight, more preferably 75% or more by weight, even more preferably 85% or more by weight, and much more preferably 90% or more by weight. In terms of improving the polishing rate and reducing the embedding and the waviness, the content of water is preferably 99.8% or less by weight, more preferably 99.3% or less by weight, and even more preferably 98.8% or less by weight. Accordingly, the content of water in the polishing composition is preferably 55 to 99.8% by weight, more preferably 75 to 99.8% by weight, even more preferably 85 to 99.3% by weight, and much more preferably 90 to 98.8% by weight.

[pH of Polishing Composition]

It is preferable that the pH of the polishing composition of the present invention is determined appropriately in accordance with the type of the object to be polished, required quality, or the like. For example, in terms of improving the polishing rate and reducing the waviness as well as preventing corrosion of a processing machine and providing safety to workers, the pH of the polishing composition is preferably less than 7, more preferably 0.1 to 6, even more preferably 0.5 to 5, much more preferably 1 to 5, further preferably 1 to 4, and still further preferably 1 to 3.5. If necessary, the pH can be adjusted by appropriately adding a desired amount of inorganic acids such as nitric acid and sulfuric acid, organic acids such as hydroxycarboxylic acid, polycarboxylic acid, aminopolycarboxylic acid, and amino acid, metal salts or ammonium salts of these acids, or basic substances such as ammonia, sodium hydroxide, potassium hydroxide, and amine.

[Copolymer]

In terms of reducing the roll-off, the polishing composition of the present invention preferably includes a copolymer and/or its salt having a constitutional unit expressed as the following formula (I) and a constitutional unit derived from a hydrophobic monomer whose solubility in 100 g of water at 20° C. is 2 g or less. In the copolymer, the constitutional unit of the formula (I) serves as a hydrophilic constitutional unit, while the constitutional unit derived from the hydrophobic monomer serves as a hydrophobic constitutional unit. Moreover, the addition of the constitutional unit of the formula (I) and the constitutional unit derived from the hydrophobic monomer may be in any of random, block and graft forms, or in combinations thereof.

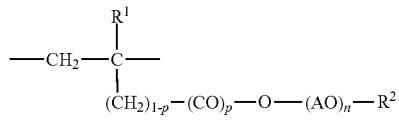

(I)

In the formula (I), $R^1$ is a hydrogen atom or a methyl group. In particular, the methyl group is preferred because the stability of the constitutional unit and the copolymer can be improved further. $R^2$ is a hydrogen atom or an alkyl group having a carbon number of 1 to 4, preferably 1 to 3, and more preferably is a methyl group. Moreover, in the formula (I), AO is an oxyalkylene group including an oxyethylene group and having a carbon number of 2 to 8, and preferably 2 to 3. The proportion of the oxyethylene group in $(AO)_n$ is 80 mol % or more, preferably 90 mol % or more, and more preferably 100 mol %. In the formula (I), to suppress the roll-off and foaming of the polishing composition and to improve the dispersibility of the copolymer, n is the total average number of mols of AO added and preferably ranges from 9 to 250, more preferably 23 to 200, even more preferably 60 to 170, and particularly preferably 90 to 150. In the formula (I), p is 0 or 1. In terms of suppressing the roll-off and foaming of the polishing composition as well as improving the dispersibility of the copolymer, p is preferably 1.

The hydrophobic monomer, whose solubility in 100 g of water at 20° C. is 2 g or less, is not easily dissolved in water. In terms of suppressing the roll-off and foaming of the polishing composition, the solubility of the hydrophobic monomer in 100 g of water at 20° C. is preferably 0 to 1 g, and more preferably 0 to 0.1 g. Preferred examples of the hydrophobic monomer include a polyalkylene glycol acrylate monomer except for an alkyl acrylate monomer, an alkyl methacrylate monomer, and a polyethylene glycol acrylate monomer, a polyalkylene glycol methacrylate monomer except for a polyethylene glycol methacrylate monomer, a styrene monomer, an alkyl acrylamide monomer, and an alkyl methacrylamide monomer.

In terms of reducing the roll-off, the constitutional unit derived from the hydrophobic monomer is preferably at least one selected from the constitutional units expressed as the following formulas (II) to (IV), and more preferably is the constitutional unit of the formula (II). In terms of the stability of the compound, it is preferably the constitutional unit of the formula (IV).

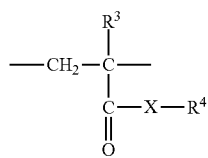

(II)

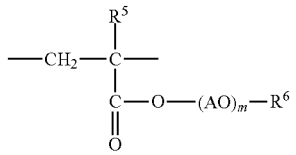

(III)

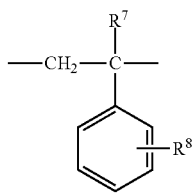

(IV)

In the formula (II), $R^3$ is preferably a hydrogen atom or a methyl group. To further improve the stability of the constitutional unit and the copolymer, the methyl group is preferred. X is an oxygen atom or an NH group. To further suppress the roll-off, the oxygen atom is preferred. In terms of suppressing the roll-off, $R^4$ is an alkyl group having a carbon number of 1 to 30, preferably 4 to 30, and more preferably 4 to 22 or an aryl group having a carbon number of 6 to 30, and preferably 6 to 22. To further suppress the roll-off and foaming of the polishing composition, $R^4$ is preferably an alkyl group having a carbon number of 4 to 22, more preferably 8 to 18, and even more preferably 12 to 18. Moreover, $R^4$ may be any type of straight-chain, branched-chain and cyclic, may be either saturated or unsaturated, or may include an element other than a carbon atom and a hydrogen atom. The element may be a nitrogen atom, an oxygen atom, a sulfur atom, etc.

In the formula (III), $R^5$ is preferably a hydrogen atom or a methyl group, and $R^6$ is preferably a hydrogen atom or an alkyl group having a carbon number of 1 to 3. To further improve the stability of the constitutional unit and the copolymer, it is preferable that both $R^5$ and $R^6$ are the methyl groups. AO is preferably an oxyalkylene group having a carbon number of 2 to 4, more preferably 3 to 4, and even more preferably is an oxypropylene group. The proportion of the oxypropylene group and the oxybutylene group in $(AO)_m$ is preferably 80 mol % or more, more preferably 90 mol % or more, and even more preferably 100 mol %. In the formula (III), to suppress the roll-off and to improve the dispersibility of the copolymer, m is the total average number of mols of AO added and preferably ranges from 3 to 150. The lower limit of m is preferably 4 or more, more preferably 6 or more, even more preferably 9 or more, and particularly preferably 13 or more, since this can further suppress the roll-off. The upper limit of m is preferably 100 or less, more preferably 75 or less, even more preferably 50 or less, and particularly preferably 20 or less, since this can further improve the dispersibility of the copolymer in the polishing composition. Accordingly, m is a number preferably in the range of 4 to 100, more preferably in the range of 6 to 75, even more preferably in the range of 9 to 50, and particularly preferably in the range of 13 to 20.

In the formula (IV), $R^7$ is preferably a hydrogen atom or a methyl group, and the hydrogen atom is more preferred. $R^8$ is preferably a hydrogen atom or an alkyl group having a carbon number of 1 to 30. To suppress the roll-off and to improve the dispersibility of the copolymer, the hydrogen atom is preferred. As monomers for forming the constitutional unit of the formula (IV), e.g., styrenes such as styrene (St), α-methyl styrene, and vinyltoluene can be used, and styrene is preferred.

In terms of reducing the roll-off and improving the dispersibility, the weight ratio of the constitutional unit (hydrophilic constitutional unit) of the formula (I) to the constitutional unit (hydrophobic constitutional unit) derived from the hydrophobic monomer (the weight of the hydrophilic constitutional unit/the weight of the hydrophobic constitutional unit) of the copolymer is preferably 25/75 to 97.5/2.5, more preferably 40/60 to 92.5/7.5, and even more preferably 65/35 to 85/15. The weight ratio of each of the constitutional units in the copolymer can be calculated by measuring a deuterated dimethyl sulfoxide solution containing 1% by weight of the copolymer with a proton nuclear magnetic resonance spectrum.

In terms of reducing the roll-off and improving the dispersibility, the weight-average molecular weight of the copolymer and/or its salt is preferably 5000 to 500000, more preferably 20000 to 500000, even more preferably 20000 to 450000, much more preferably 60000 to 450000, further preferably 60000 to 400000, and still further preferably 90000 to 400000. The weight-average molecular weight can be measured by a gel permeation chromatography (GPC) method under the following conditions.

GPC Conditions
Column: α-M-α-M
Eluant: 60 mmol/L $H_3PO_4$, 50 mmol/L LiBr/DMF
Flow rate: 1.0 mL/min
Column temperature: 40° C.
Detector: RI
Reference material: polystyrene The copolymer may include other monomers in addition to the monomers for forming the constitutional unit of the formula (I) and the hydrophobic monomer.

The content of the copolymer and/or its salt in the polishing composition is preferably 3% or less by weight, more preferably 2% or less by weight, and even more preferably 1% or less by weight, since this can further suppress foaming of the polishing composition. Moreover, the content of the copolymer is preferably 0.001% or more by weight, more preferably 0.003% or more by weight, and even more preferably 0.005% or more by weight, since this can further suppress the roll-off. Accordingly, the content of the copolymer is preferably 0.001 to 3% by weight, more preferably 0.003 to 2% by weight, and even more preferably 0.005 to 1% by weight.

[Other Components]

The polishing composition of the present invention may include other components in order to further improve the polishing rate, reduce the embedding and the waviness, and achieve other purposes. The other components can be metal oxide abrasive grains such as colloidal titanium oxide, inorganic salts, a thickening agent, a rust-preventive agent, basic substances, etc. The other components may be used individually or in combinations of two or more. In terms of the cost effectiveness, the content of the other components in the polishing composition is preferably 0.05 to 20% by weight, more preferably 0.05 to 10% by weight, and even more preferably 0.05 to 5% by weight.

Moreover, the polishing composition of the present invention may include a bactericidal agent, an antimicrobial agent, etc. as the other components as needed. In terms of the functionality of the agents, the influence on the polishing performance, and the cost effectiveness, the content of the bactericidal agent or antimicrobial agent in the polishing composition is preferably 0.0001 to 0.1% by weight, more preferably 0.001 to 0.05% by weight, and even more preferably 0.002 to 0.02% by weight.

[Substrate to be Polished (Polishing Object)]

A substrate to be polished (polishing object) by the polishing composition of the present invention is generally used for the manufacture of a hard disk substrate or a substrate for a magnetic recording medium. Specifically, the substrate to be polished is typified by a substrate obtained by plating an aluminum alloy with a Ni—P alloy. Examples of the substrate to be polished also include a substrate obtained by plating glass or glassy carbon instead of the aluminum alloy with the Ni—P. Alternatively, instead of the Ni—P plating, a substrate may be coated with various types of metal compounds by plating or vapor deposition. The effect of reducing the embedding of alumina into the substrate after polishing is prominent for the Ni—P plated substrate, and more prominent for the substrate to be polished that is used for the manufacture of a hard disk substrate for a perpendicular magnetic recording system. Therefore, the polishing composition of the present invention is suitable for the substrate to be polished that is used for the manufacture of a hard disk substrate for a perpendicular magnetic recording system.

Moreover, the polishing composition of the present invention can significantly reduce the embedding of alumina into the Ni—P plated substrate (particularly, a substrate obtained by plating an aluminum alloy with a Ni—P alloy) after polishing, preferably can reduce the embedding and the waviness, and more preferably can reduce the embedding, the waviness, and the roll-off. Thus, the polishing composition of the present invention is suitable for the substrate to be polished that is used for the manufacture of a high recording density hard disk substrate, preferably a hard disk substrate with a recording density of 200 Gbit/square inch or more, more preferably a hard disk substrate with a recording density of 300 Gbit/square inch or more, and even more preferably a hard disk substrate with a recording density of 400 Gbit/square inch or more.

[Method for Preparing the Polishing Composition]

There is no particular limitation to a method for preparing the polishing composition of the present invention. For example, the polishing composition can be prepared by mixing alumina particles, silica particles, an acid or its salt, and an oxidizing agent in an appropriate aqueous medium. The alumina particles and the silica particles can be dispersed using any stirring device such as a homomixer, a homogenizer, an ultrasonic disperser, or a wet ball mill. The content and concentration of each component in the polishing composition of the present invention fall in the ranges as described above. However, in another aspect, the polishing composition may be prepared in the form of a concentrated composition.

[Method for Manufacturing a Hard Disk Substrate]

In another aspect, the present invention relates to a method for manufacturing a hard disk substrate. The method for manufacturing a hard disk substrate of the present invention (also referred to as the manufacturing method of the present invention in the following) includes as a first embodiment polishing a substrate to be polished with the polishing composition of the present invention (also referred to as a "polishing process using the polishing composition of the present invention" in the following). In the polishing process using the polishing composition of the present invention, e.g., the substrate to be polished is sandwiched between polishing pads, and the polishing composition of the present invention is supplied to the polishing surface. Then, polishing can be performed by moving the polishing pads or the substrate to be polished while applying pressure. The polishing composition of the present invention may be used as it is. If the polishing composition is in the form of a concentrated composition, it may be diluted. In such a case, the dilution rate is not particularly limited, and can be determined appropriately in accordance with the concentration of each component (e.g., the content of the abrasive grains) in the concentrated composition, the polishing conditions, or the like. The substrate to be polished as described above can be used.

In terms of reducing the embedding, the waviness, and the roll-off, the polishing pressure in the polishing process using the polishing composition of the present invention is preferably 50 kPa or less, more preferably 25 kPa or less, even more preferably 15 kPa or less. In terms of the productivity (polishing rate), the polishing pressure is preferably 3 kPa or more, more preferably 5 kPa or more, and even more preferably 7 kPa or more. Accordingly, the polishing pressure is preferably 3 to 50 kPa, more preferably 5 to 25 kPa, and even more preferably 7 to 15 kPa. The polishing pressure means the pressure of a surface plate applied to the polishing surface of the substrate to be polished during polishing. The polishing pressure can be adjusted by controlling air pressure or a weight imposed on the surface plate or the substrate.

Conventionally, in the rough polishing process using alumina particles during the manufacture of a hard disk substrate, when the substrate to be polished is a Ni—P plated substrate (particularly, a substrate obtained by plating an aluminum alloy with a Ni—P alloy), the practical polishing pressure is approximately, e.g., 4.9 to 9.8 kPa, since a rise in polishing pressure may improve the polishing rate, but adversely increases the waviness of the substrate surface after polishing. According to the polishing composition of the present invention, however, even if the polishing pressure is higher than that of the conventional polishing, the polishing rate can be improved while preventing the waviness of the substrate surface from becoming worse. Although the mechanism of preventing the waviness of the substrate surface from becoming worse after polishing remains unclear, it is assumed that the silica particles included in the polishing composition of the present invention serve to form a smooth polished surface, and thus can reduce the waviness. However, the present invention is not limited to this assumption.

Therefore, the manufacturing method of the present invention requires as a second embodiment that the polishing pressure in the "polishing process using the polishing composition of the present invention" according to the first embodiment is 10.3 to 16.7 kPa. By controlling the polishing pressure in this range, the polishing rate can be improved while the waviness of the substrate surface that is comparable to the conventional polishing at a lower polishing pressure is maintained after polishing. Therefore, the manufacturing method of the present invention according to the second embodiment can preferably provide a hard disk substrate suitable for higher recording density while improving the productivity. In terms of improving the polishing rate while preventing the waviness of the substrate surface from becoming worse, the polishing pressure in the polishing process of the second embodiment is 10.3 to 16.7 kPa, preferably 10.5 to 16.0 kPa, more preferably 11.0 to 15.0 kPa, and even more preferably 11.5 to 15.0 kPa. The substrate to be polished in the manufacturing method of the present invention according to the second embodiment is preferably a Ni—P plated substrate, and more preferably a substrate obtained by plating an aluminum alloy with a Ni—P alloy.

In terms of reducing the cost, the supply rate of the polishing composition during the polishing process using the polishing composition of the present invention is preferably 0.25 mL/min or less, more preferably 0.2 mL/min or less, and even more preferably 0.16 mL/min or less per 1 cm$^2$ of the substrate to be polished. Moreover, the supply rate is preferably 0.01 mL/min or more, more preferably 0.025 mL/min or more, and even more preferably 0.05 mL/min or more per 1 cm$^2$ of the substrate to be polished, since this can further improve the polishing rate. Accordingly, the supply rate is preferably 0.01 to 0.25 mL/min, more preferably 0.025 to 0.2 mL/min, and even more preferably 0.05 to 0.16 mL/min per 1 cm$^2$ of the substrate to be polished. There is no particular limitation to other polishing conditions (the type of a polishing machine, polishing temperature, etc.) in the polishing process using the polishing composition of the present invention.

The polishing pad used in the present invention is not particularly limited, and can be, e.g., a polishing pad made of nonwoven fabric or porous organic polymer. The shape, size, etc. of the polishing pad are not particularly limited. The material of the polishing pad is not particularly limited either, and can be, e.g., an organic polymer such as urethane or an organic polymer containing various additives such as carbon and ceria.

The manufacturing method of the present invention is preferably a multistage polishing system that includes two or more stages of polishing. It is also preferable that the "polishing process using the polishing composition of the present invention" as described above is performed prior to the finish polishing process (i.e., the final process) as a rough polishing process. Therefore, the manufacturing method of the present invention includes as a third embodiment at least a rough polishing process and a finish polishing process after the rough polishing process, and requires that the "polishing process using the polishing composition of the present invention" is performed in the rough polishing process. The polishing process using the polishing composition of the present invention in the rough polishing process also can be employed in any of the polishing processes in the first and second embodiments.

In terms of the surface quality of a hard disk substrate, e.g., reducing the surface defects such as waviness, surface roughness, and scratches, the average particle size (e.g., volume median diameter) of the primary particles of the abrasive grains is preferably 0.1 µm or less, more preferably 0.08 µm or less, even more preferably 0.05 µm or less, and much more preferably 0.03 µm or less. In terms of improving the polishing rate, the average particle size is preferably 0.005 µm or more, and more preferably 0.01 µm or more.

The abrasive particles included in the polishing composition used in the finish polishing process can be, e.g., fumed silica abrasive grains or colloidal silica abrasive grains. In terms of reducing the surface defects such as surface roughness and scratches, the colloidal silica abrasive grains are preferred. The average particle size (e.g., volume median diameter) of the primary particles of the colloidal silica grains is preferably 0.005 to 0.08 µm, more preferably 0.005 to 0.05 µm, and even more preferably 0.01 to 0.03 µm.

When the abrasive particles including the primary particles with an average particle size of 0.005 to 0.1 µm are used in the finish polishing process, the amount of polishing is preferably 0.05 to 0.5 µm, more preferably 0.1 to 0.4 µm, and even more preferably 0.2 to 0.4 µm. There is no particular limitation to other conditions (the type of a polishing machine, polishing temperature, polishing rate, supply of polishing liquid, etc.) of the finish polishing. The polishing pressure is preferably 3 to 50 kPa, more preferably 5 to 25 kPa, and even more preferably 7 to 15 kPa. The amount of polishing can be determined in the manner of Examples, as will be described later.

The polishing in the polishing process using the polishing composition of the present invention can preferably reduce the waviness and the embedding of abrasive grains into the substrate after polishing without reducing the polishing rate.

Therefore, the manufacturing method of the present invention can preferably provide a hard disk substrate suitable for a high recording density. The "polishing process using the polishing composition of the present invention" in the manufacturing method of the present invention is particularly effective as a polishing process, but also can be similarly applied to the other polishing process such as a lapping process or the like.

The hard disk substrate obtained by the manufacturing method of the present invention preferably has improved surface quality because the embedding of alumina is significantly reduced. Therefore, the hard disk substrate is suitable for, e.g., high recording density, and particularly suitable for the manufacture of a hard disk substrate for a perpendicular magnetic recording system and/or a hard disk substrate with a recording density of preferably 200 Gbit/square inch or more, more preferably 300 Gbit/square inch or more, and even more preferably 400 Gbit/square inch or more. Thus, in another aspect, the manufacturing method of the present invention is a method for manufacturing a hard disk substrate for a perpendicular magnetic recording system and/or a hard disk substrate with a recording density of preferably 200 Gbit/square inch or more, more preferably 300 Gbit/square inch or more, and even more preferably 400 Gbit/square inch or more.

The manufacturing method of the present invention may further include a process of preparing a substrate to be polished and/or a process of forming the polished substrate into a magnetic disk for a hard disk substrate. In other words, as yet another embodiment, the manufacturing method of the present invention may include the following processes in the indicated order: preparing a substrate to be polished; polishing the substrate to be polished according to any of the first to third embodiments; and forming the polished substrate into a magnetic disk for a hard disk substrate.

[Polishing Method]

In another aspect, the present invention relates to a method for polishing a substrate to be polished, including polishing the substrate to be polished with the polishing composition of the present invention. In this aspect, the polishing process of the substrate to be polished with the polishing composition of the present invention is preferably the "polishing process using the polishing composition of the present invention" in the first and second embodiments. The type of the substrate to be polished, the polishing method, and the polishing conditions can be the same as described above. The polishing method of the present invention can provide a substrate in which the embedding of alumina is significantly reduced.

As described above, the substrate to be polished by the polishing method of the present invention is used for the manufacture of a hard disk substrate or a substrate for a magnetic recording medium, and in particular, preferably used for the manufacture of a hard disk substrate for a perpendicular magnetic recording system and/or a hard disk substrate with a recording density of preferably 200 Gbit/square inch or more, more preferably 300 Gbit/square inch or more, and even more preferably 400 Gbit/square inch or more.

As a preferred embodiment, the polishing method of the present invention includes polishing the substrate to be polished with the polishing composition of the present invention, in which the substrate to be polished is used for manufacturing a hard disk substrate for a perpendicular magnetic recording system, the polishing pressure during the polishing is 10.3 to 16.7 kPa, and the polishing process is a rough polishing process. This preferred embodiment corresponds to the second embodiment of the manufacturing method of the present invention, and thus can refer to the preferred polishing pressure and substrate to be polished. With the polishing method of the present invention according to this embodiment, the polishing rate can be improved while the waviness of the substrate surface that is comparable to the conventional polishing at a lower polishing pressure is maintained after polishing. Therefore, the polishing method can improve the productivity of a hard disk substrate suitable for higher recording density.

EXAMPLES

The following examples further describe and demonstrate embodiments of the present invention. The examples are given solely for the purpose of illustration and are not to be construed as limitations of the present invention.

1. Preparation of Polishing Composition

The polishing compositions in Examples 1 to 33 and Comparative Examples 1 to 14 were prepared with the compositions shown in Table 1 by using α-alumina (the volume median diameter of secondary particles: 0.3 μm or 0.6 μm), θ-alumina (the volume median diameter of secondary particles: 0.16 μm), colloidal silica, a maleic acid, a citric acid, a sulfuric acid (98% product), a hydrogen peroxide (35 wt % product, manufactured by Adeka Corporation), and water. The copolymers that were synthesized using the monomers shown in Table 4 were added to the polishing compositions in Examples 21 to 26. The solubility in Table 4 indicates solubility (g) in 100 g of water at 20° C. The particle size of the alumina particles and the content of the α-alumina were measured in the following manner.

[Measurement of a Particle Size of Secondary Particles of Alumina Particles]

The particle sizes ($D_{10}$, $D_{50}$, and $D_{90}$) of the secondary particles were measured under the following measurement conditions. $D_{10}$, $D_{50}$, and $D_{90}$ represent the particle sizes at which the cumulative volume distribution (volume basis) of the secondary particles from a smaller particle size side reach 10%, 50%, and 90%, respectively. $D_{50}$ is identified as a volume median diameter.

Measuring equipment: laser beam diffraction/scattering particle size distribution analyzer LA-920 manufactured by HORIBA Ltd.

Circulation strength: 4
Ultrasonic intensity: 4

[Content of α-Alumina in Alumina Particles]

20 g of the polishing composition was dried at 105° C. for 5 hours, resulting in a powder. The peak area of the 104 plane of the powder thus obtained was measured with an X-ray diffractometer (RINT2500VPC manufactured by Rigaku Corporation) at a tube voltage of 40 kW and a tube current of 120 mA. The α-alumina content was calculated by the following formula based on the peak area of the alumina particles (WA-1000 produced by SHOWA DENKO K.K.) that was measured in the same manner.

α-alumina content (% by weight)=(peak area of sample)/(peak area of *WA*-1000)×100

As the silica particles, silica particles A to R shown in Table 2 were used, and one or more types were selected as shown in Table 3. The particle size distribution, the volume median diameter, and the standard deviation in the particle size of the silica particles were measured in the following manner. First, the silica particles in slurry form were used as a sample, and the sample was observed with a transmission electron microscope (TEM) ("JEM-2000FX", 80 kV, 10000-50000× manufactured by JEOL Ltd.), and the TEM images were photographed and scanned into a personal computer as image data using a scanner. Then, the diameter of a circle having the same area as the projected area of each silica particle was calculated with analysis software "WinROOF" (commercially available from Mitani Corporation) and identified as a particle diameter. After 1000 or more silica particle data were analyzed, the number-basis average particle size and the standard deviation of the silica particles were determined based on the analysis results by using spreadsheet software "EXCEL" (manufactured by Microsoft Corporation). Moreover, based on the particle size distribution data of the silica particles obtained by converting the particle diameter into a particle volume with the spreadsheet software "EXCEL", the proportion (% by volume) of the particles having a specific particle size in the whole particles was expressed as a cumulative frequency from a smaller particle size side, thereby providing the cumulative volume frequency (%). Based on the particle size and the cumulative volume frequency data of the silica particles thus determined, the cumulative volume frequency was plotted against the particle size, so that a graph of particle size versus cumulative volume frequency was obtained. In this graph, a particle size at which the cumulative volume frequency of the silica particles from the smaller particle size side reaches 50% is defined as the volume median diameter (average particle size). Moreover, the volume fraction (%) of the silica particles having a particle size of 20 to 120 nm, 20 to 40 nm, 60 to 80 nm, and 100 to 120 nm in the whole silica particles was determined from the particle size distribution data (% by volume), respectively.

[Synthesis of Copolymer]

The synthesis of the copolymers in Examples 21 to 26 will be described by referring to the copolymer (SMA/PEGMA (20:80)) in Example 24. The other copolymers were synthesized in the same manner as Example 24 except that the monomers shown in Table 4 were used as materials. The copolymer in Example 24 was synthesized by using methoxypolyethylene glycol (23 mol) methacrylate (PEGMA (EO23)) as a monomer for forming the constitutional unit of the formula (I), and stearyl methacrylate (SMA) as a monomer for forming the constitutional unit of the formula (II). Specifically, 80 g of (PEGMA (EO23)), 20 g of SMA, 100 g of methyl ethyl ketone that served as a polymerization solvent, and 1.0 g of a polymerization initiator ("V-65" manufactured by Wako Pure Chemical Industries, Ltd.) were placed in a reactor provided with an agitator, a reflux condenser, a thermometer, and a nitrogen inlet tube. After a polymerization reaction was performed at 65° for 6 hours, the product was dried, resulting in a copolymer. The weight-average molecular weight of the copolymer thus obtained was 125000. The proportion of (PEGMA (EO23)) in the copolymer was 80 wt %, and the proportion of SMA in the copolymer was 20 wt %. The weight average molecular weight of the copolymer and the proportion of each of the constitutional units in the copolymer were measured in the following manner.

[Measuring Method of Weight-Average Molecular Weight]

The copolymer was dissolved in chloroform, and a weight-average molecular weight was measured by GPC (gel permeation chromatography, eluent: 60 mmol/L $H_3PO_4$, 50 mmol/L LiBr/DMF) using polystyrene as a reference material.

[Measuring Method of Proportion of Each Constitutional Unit in Copolymer]

The copolymer was dissolved in a deuterated dimethyl sulfoxide solution (copolymer concentration: 1% by weight) and measured with a proton nuclear magnetic resonance spectrum.

TABLE 1

| | | α alumina volume median diameter (μm) | α alumina content (wt %) | θ alumina volume median diameter (μm) | θ alumina content (wt %) | Content weight ratio α/θ | Total content (wt %) | Silica particle content (wt %) | Maleic acid content (wt %) | Citric acid content (wt %) | Sulfuric acid content (wt %) | Hydrogen peroxide content (wt %) | pH | Copolymer content (wtppm) |
|---|---|---|---|---|---|---|---|---|---|---|---|---|---|---|
| Examples | 1 | 0.3 | 0.96 | — | — | 100/0 | 0.96 | 2.88 | 0.8 | — | — | 1.2 | 1.9 | — |
| | 2 | | | | | | | | | | | | | |
| | 3 | | | | | | | | | | | | | |
| | 4 | | | | | | | | | | | | | |
| | 5 | | | | | | | | | | | | | |
| | 6 | | | | | | | | | | | | | |
| | 7 | | | | | | | | | | | | | |
| | 8 | | | | | | | | | | | | | |
| | 9 | | | | | | | | | | | | | |
| | 10 | 0.3 | 0.96 | — | — | 100/0 | 0.96 | 2.88 | 0.5 | — | 0.6 | 1.2 | 1.5 | — |
| | 11 | | 0.58 | 0.16 | 0.38 | 60/40 | | | | | | | | |
| | 12 | 0.3 | 0.96 | — | — | 100/0 | 0.96 | 2.88 | 0.8 | — | — | 1.2 | 1.9 | — |
| | 13 | | | | | | | | | | | | | |
| | 14 | 0.3 | 0.96 | — | — | 100/0 | 0.96 | 2.88 | — | 0.5 | 0.4 | 1.2 | 1.6 | — |
| | 15 | | | | | | | | | | | | | |
| | 16 | | | | | | | | | | | | | |
| | 17 | 0.3 | 0.96 | — | — | 100/0 | 0.96 | 2.88 | — | 0.8 | — | 1.2 | 2.5 | — |
| | 18 | 0.3 | 0.72 | 0.16 | 0.24 | 75/25 | 0.96 | 2.88 | — | 0.5 | 0.4 | 1.2 | 1.6 | — |
| | 19 | | | | | | | | | | | 0.2 | | 2.0 | |
| | 20 | | | | | | | | | | | 0.4 | | 1.5 | |
| | 21 | 0.3 | 0.72 | 0.16 | 0.24 | 75/25 | 0.96 | 2.88 | — | 0.5 | 0.4 | 1.2 | 1.5 | 25 |
| | 22 | | | | | | | | | | | | | | 50 |
| | 23 | | | | | | | | | | | | | | 100 |
| | 24 | | | | | | | | | | | | | | 100 |
| | 25 | | | | | | | | | | | | | | 100 |
| | 26 | | | | | | | | | | | | | | 100 |
| | 27 | 0.3 | 1.92 | — | — | 100/0 | 1.92 | 1.92 | 0.8 | — | — | 1.2 | 1.9 | — |
| | 28 | | 0.38 | | | | 0.38 | 3.46 | | | | | | |
| | 29 | 0.6 | 1.16 | 0.16 | 0.77 | 60/40 | 1.92 | 1.92 | 0.8 | — | — | 1.2 | 1.9 | — |

TABLE 1-continued

| | | Alumina particles | | | | | | | | | | | |
|---|---|---|---|---|---|---|---|---|---|---|---|---|---|
| | | α alumina volume median diameter (μm) | α alumina content (wt %) | θ alumina volume median diameter (μm) | θ alumina content (wt %) | Content weight ratio α/θ | Total content (wt %) | Silica particle content (wt %) | Maleic acid content (wt %) | Citric acid content (wt %) | Sulfuric acid content (wt %) | Hydrogen peroxide content (wt %) | pH | Copolymer content (wtppm) |
| | 30 | | 0.69 | | 0.46 | | 1.15 | 2.69 | | | | | | |
| | 31 | | 0.58 | | 0.38 | | 0.96 | 2.88 | | | | | | |
| | 32 | | 0.46 | | 0.31 | | 0.77 | 3.07 | | | | | | |
| | 33 | | 0.23 | | 0.15 | | 0.38 | 3.46 | | | | | | |
| Comparative examples | 1 | 0.3 | 0.96 | — | — | 100/0 | 0.96 | 2.88 | 0.8 | — | — | 1.2 | 1.9 | — |
| | 2 | | | | | | | | | | | | | |
| | 3 | | | | | | | | | | | | | |
| | 4 | | | | | | | | | | | | | |
| | 5 | | | | | | | | | | | | | |
| | 6 | | | | | | | | | | | | | |
| | 7 | | | | | | | | | | | | | |
| | 8 | | | | | | | | | | | | | |
| | 9 | | | | | | | | | | | | | |
| | 10 | | | | | | | | | | | | | |
| | 11 | | | | | | | | | | | | | |
| | 12 | | | | | | | | | | | | | |
| | 13 | 0.3 | 3.84 | — | — | 100/0 | 3.84 | — | 0.8 | — | — | 1.2 | 1.9 | — |
| | 14 | 0.6 | | | | | | | | | | | | |

TABLE 2

| | Volume median diameter | Number-basis standard deviation | Manufacturer |
|---|---|---|---|
| Silica particles A | 13.4 | 2.4 | Catalysts & Chemicals Industries Co., Ltd. |
| Silica particles B | 24.2 | 3.8 | Catalysts & Chemicals Industries Co., Ltd. |
| Silica particles C | 36.2 | 7.2 | Catalysts & Chemicals Industries Co., Ltd. |
| Silica particles D | 38.5 | 6.4 | Catalysts & Chemicals Industries Co., Ltd. |
| Silica particles E | 53.5 | 6.7 | Catalysts & Chemicals Industries Co., Ltd. |
| Silica particles F | 26.1 | 5.6 | Nissan Chemical Industries Ltd. |
| Silica particles G | 52.5 | 10.5 | Nissan Chemical Industries Ltd. |
| Silica particles H | 83.8 | 14.7 | Nissan Chemical Industries Ltd. |
| Silica particles I | 103.4 | 5.8 | Catalysts & Chemicals Industries Co., Ltd. |
| Silica particles J | 134.5 | 4.83 | Catalysts & Chemicals Industries Co., Ltd. |
| Silica particles K | 176.7 | 5.32 | Catalysts & Chemicals Industries Co., Ltd. |
| Silica particles L | 45.4 | 11 | NALCO COMPANY |
| Silica particles M | 68.6 | 8 | NALCO COMPANY |
| Silica particles N | 37.6 | 8.5 | Eka Chemicals Co., Ltd. |
| Silica particles O | 43.7 | 12.6 | Eka Chemicals Co., Ltd. |
| Silica particles P | 15 | 3.2 | DuPont |
| Silica particles Q | 22.5 | 4.1 | DuPont |
| Silica particles R | 79.8 | 15.8 | DuPont |

TABLE 3

| | | Content of silica particles (wt %) | | | | | | | | | | | | | |
|---|---|---|---|---|---|---|---|---|---|---|---|---|---|---|---|
| | | A | B | C | D | E | G | H | I | J | K | L | M | O | R | Total |
| Examples | 1 | | | | | | | | | | | | | | 2.88 | 2.88 |
| | 2 | | | | | | | | | | | 2.88 | | | | 2.88 |
| | 3 | | | | | | | | | | | | | 2.88 | | 2.88 |
| | 4 | | 0.14 | 0.14 | | 0.29 | 0.29 | 0.43 | 0.58 | 0.58 | 0.43 | | | | | 2.88 |
| | 5 | | 0.14 | 0.14 | | 0.29 | 0.43 | 0.58 | 0.58 | 0.43 | 0.29 | | | | | 2.88 |
| | 6 | | 0.14 | 0.29 | | 0.43 | 0.58 | 0.58 | 0.43 | 0.29 | 0.14 | | | | | 2.88 |
| | 7 | 0.08 | 0.15 | 0.25 | 0.34 | 0.48 | 0.53 | 0.65 | 0.40 | | | | | | | 2.88 |
| | 8 | | 0.10 | 0.20 | 0.31 | 0.49 | 0.59 | 0.81 | 0.39 | | | | | | | 2.88 |
| | 9 | | 0.04 | 0.17 | 0.37 | | 0.50 | 1.50 | 0.30 | | | | | | | 2.88 |
| | 10 | | 0.04 | 0.17 | 0.37 | | 0.50 | 1.50 | 0.30 | | | | | | | 2.88 |
| | 11 | | 0.04 | 0.17 | 0.37 | | 0.50 | 1.50 | 0.30 | | | | | | | 2.88 |
| | 12 | | 0.58 | | | | | 2.00 | 0.30 | | | | | | | 2.88 |
| | 13 | | | | 0.58 | | | 2.00 | 0.30 | | | | | | | 2.88 |
| | 14 | | | | | | | | 0.30 | | | 0.43 | 2.14 | | | 2.88 |
| | 15 | | | | | | | | 0.30 | | | 0.54 | 2.04 | | | 2.88 |
| | 16 | | | | | | | | 0.30 | | | 0.73 | 1.85 | | | 2.88 |
| | 17 | | | | | | | | 0.30 | | | 1.28 | 1.30 | | | 2.88 |

TABLE 3-continued

| | | | | | | | | | | | | | |
|---|---|---|---|---|---|---|---|---|---|---|---|---|---|
| 18 | | | | | | | 0.30 | | 1.28 | 1.30 | | | 2.88 |
| 19 | | | | | | | 0.30 | | 1.28 | 1.30 | | | 2.88 |
| 20 | | | | 0.72 | | | | | | 2.16 | | | 2.88 |
| 21 | | | | | | | 0.30 | | 1.28 | 1.30 | | | 2.88 |
| 22 | | | | | | | 0.30 | | 1.28 | 1.30 | | | 2.88 |
| 23 | | | | | | | 0.30 | | 1.28 | 1.30 | | | 2.88 |
| 24 | | | | | | | 0.30 | | 1.28 | 1.30 | | | 2.88 |
| 25 | | | | | | | 0.30 | | 1.28 | 1.30 | | | 2.88 |
| 26 | | | | | | | 0.30 | | 1.28 | 1.30 | | | 2.88 |
| 27 | 0.03 | 0.11 | 0.25 | | 0.33 | 1.00 | 0.20 | | | | | | 1.92 |
| 28 | 0.05 | 0.20 | 0.44 | | 0.60 | 1.80 | 0.36 | | | | | | 3.46 |
| 29 | 0.03 | 0.11 | 0.25 | | 0.33 | 1.00 | 0.20 | | | | | | 1.92 |
| 30 | 0.04 | 0.15 | 0.35 | | 0.47 | 1.40 | 0.28 | | | | | | 2.69 |
| 31 | 0.04 | 0.17 | 0.37 | | 0.50 | 1.50 | 0.30 | | | | | | 2.88 |
| 32 | 0.04 | 0.18 | 0.39 | | 0.53 | 1.60 | 0.32 | | | | | | 3.07 |
| 33 | 0.05 | 0.20 | 0.44 | | 0.60 | 1.80 | 0.36 | | | | | | 3.46 |

| | | Content of silica particles (wt %) | | | | | | | | | | | |
|---|---|---|---|---|---|---|---|---|---|---|---|---|---|
| | | A | B | C | D | E | F | G | H | I | M | N | P | Q | Total |
| Comparative Examples | 1 | 2.88 | | | | | | | | | | | | | 2.88 |
| | 2 | | 2.88 | | | | | | | | | | | | 2.88 |
| | 3 | | | 2.88 | | | | | | | | | | | 2.88 |
| | 4 | | | | 2.88 | | | | | | | | | | 2.88 |
| | 5 | | | | | 2.88 | | | | | | | | | 2.88 |
| | 6 | | | | | | | | | | 2.88 | | | | 2.88 |
| | 7 | | | | | | 2.88 | | | | | | | | 2.88 |
| | 8 | | | | | | | 2.88 | | | | | | | 2.88 |
| | 9 | | | | | | | | | | | | 2.88 | | 2.88 |
| | 10 | | | | | | | | | | | | | 2.88 | 2.88 |
| | 11 | | | | | | | | | | | 2.88 | | | 2.88 |
| | 12 | | | | | | | | | | 2.88 | | | | 2.88 |

TABLE 4

| | Copolymer | | | | |
|---|---|---|---|---|---|
| | Constitutional unit of formula (I) | Constitutional unit derived from | | | |
| | PEGMA | hydrophobic monomer | | | Molecular weight |
| | (EO (mol)) | wt % | Material monomer | wt % | Solubility (g) | |
| Example 21 | 23 mol | 70 | St | 30 | 0.03 | 63000 |
| Example 22 | | | | | | |
| Example 23 | | | | | | |
| Example 24 | 23 mol | 80 | SMA | 20 | <0.01 | 125000 |
| Example 25 | 23 mol | 80 | PMMA | 20 | <0.01 | 62000 |
| Example 26 | 23 mol | 80 | LMA | 20 | <0.01 | 96000 |

PEGMA: methoxypolyethylene glycol methacrylate (EO 23 mol)
St: styrene
SMA: stearyl methacrylate
PMMA: polymethyl methacrylate
LMA: lauryl methacrylate 2. Polishing of Substrate The substrates were polished with each of the polishing compositions prepared in Examples 1 to 33 and Comparative Examples 1 to 14 under the following polishing conditions.

[Substrate to be Polished]

A Ni—P plated aluminum alloy substrate was used as the substrate to be polished. This substrate had a thickness of 1.27 mm and a diameter of 95 mm. The amplitude of the waviness (wavelength: 0.5 to 5 mm) measured with "New View 5032" (manufactured by Zygo Corporation) was 1.6 nm.

[Polishing Conditions]

Polishing test machine: a double-sided polishing machine ("9B Double Side Polisher" manufactured by Speedfam Co., Ltd.)

Polishing pad: a product with a thickness of 1.04 mm and an average pore diameter of 43 μm (manufactured by FIL-WEL CO., LTD.)

Number of revolutions of the surface plate: 45 rpm

Polishing pressure: 9.8 kPa (set value)

Supply of polishing slurry: 100 mL/min (0.076 mL)/(cm²·min)

Amount of polishing (one side): 130 mg

Number of substrates inserted into the polishing machine: 10

3. Evaluation Method

[Evaluation of Polishing Rate]

The polishing rate when using the polishing compositions of Examples 1 to 33 and Comparative Examples 1 to 14 was evaluated in the following manner. First, the weights of each substrate before and after polishing were measured with a scale ("BP-210S" manufactured by Sartorius Ltd.), and a change in weight of each substrate was determined. Then, an average of the weight changes of 10 substrates was obtained as a weight decrement, and the weight decrement was divided by the polishing time to give a weight decreasing rate. This weight decreasing rate was substituted in the following equation and thus converted to a polishing rate (μm/min). Tables 5 to 8 show the results.

Polishing rate (μm/min)=weight decreasing rate (g/min)/area of one side of a substrate (mm²)/Ni—P plating density (g/cm³)×10⁶

(where the area of one side of the substrate was 6597 mm² and the Ni—P plating density was 7.9 g/cm³)

[Evaluation of Waviness]

Two substrates were selected as desired from 10 polished substrates, and both surfaces of each of the selected substrates were measured at two points every 180° (i.e., total of 8 points) under the following conditions. An average of the measured values at 8 points was calculated as waviness of the substrate. Tables 5 to 8 show the results.

Equipment: New View 5032 manufacture by Zygo Corporation
Lens: 2.5× Michelson
Zoom ratio: 0.5
Remove: Cylinder
Filter: FFT Fixed Band Pass (0.5 to 5 mm)
Area: 4.33 mm×5.77 mm

[Evaluation of Embedding of Alumina Particles]

The polished substrate was further polished with the following finish polishing composition so that the amount of polishing was 0.035 μm±0.005 μm. Thereafter, the surface of this substrate was observed to evaluate the embedding of the alumina particles. Tables 5 to 8 show the results. The composition of the finish polishing composition, the polishing conditions, a method for measuring the amount of polishing, the observation and evaluation criteria of the embedding are described below.

<Finish Polishing Composition>

The polishing composition including 7% by weight of colloidal silica slurry (produced by DuPont, the average particle size of the primary particles is 0.02 μm) in terms of a silica particle concentration, 2% by weight of HEDP (1-hydroxyethylidene-1,1-disulfonic acid, produced by Solutia Japan Ltd.) as an effective component, 0.6% by weight of hydrogen peroxide (produced by Adeka Corporation) as an effective component, and ion-exchanged water as a residue was used.

<Polishing Conditions>

Polishing test machine: "9B Double Side Polisher" manufactured by Speedfam Co., Ltd.
Polishing pad: urethane pad for finish polishing manufactured by Fujibo
Number of revolutions of surface plate: 32.5 r/min
Supply of polishing composition: 100 mL/min
Polishing time: 0.5 to 1.5 min (adjusted so that the amount of polishing (one side) was 0.035 μm±0.005 μm)
Polishing pressure: 4.1 kPa
Number of substrates inserted into the polishing machine: 10

<Method for Measuring the Amount of Polishing>

The weights of each substrate before and after polishing were measured with a scale ("BP-210S" manufactured by Sartorius Ltd.) and substituted in the following equation, thereby determining the amount of polishing.

Weight decrement (g)={weight before polishing (g)−weight after polishing (g)}

Amount of polishing (μm)=weight decrement (g)/area of one side of a substrate $(mm^2)$/2/Ni—P plating density $(g/cm^3)$×$10^6$ (where the area of one side of the substrate was 6597 $mm^2$ and the Ni—P plating density was 8.4 $g/cm^3$)

<Method for Observing Embedding>

Using a microscope (manufactured by OLYMPUS CORPORATION, body B×60M, digital camera DP70, objective lens 100×, intermediate lens 2.5×), the alumina particles penetrated into the substrate were detected as bright spots by dark filed observation (field of view: 100×75 μm), and the number was measured. For the above observation, two substrates were selected as desired from 10 polished substrates, and both surfaces of each of the selected substrates were observed at four points that were 30 mm away from the center and at right angles to each other (i.e., total of 16 points). An average of the number of bright spots observed was defined as the number of embedding of the abrasive grains. The embedding values in Tables 5 to 8 indicate a relative value when the average of the number of embedding in Comparative Example 14 is identified as 100.

[Roll-Off Evaluation]

After polishing, 1.0-3.0 Peak roll-off of each of the substrates was measured under the following conditions by using the polishing compositions of Examples 21 to 26 including the copolymers shown in Table 4. Table 8 shows the results. The polishing composition of Example 18 was used as reference for comparison. In Table 8, the "reference example 18" shows the results. The roll-off measurement was performed in such a manner that one of the 10 substrates was selected, then roll-off was measured at any three points of this substrate, and a mean value of the three points was determined as a result of the measurement. The 1.0-3.0 Peak roll-off value indicates that the edge of the substrate rises as the value decreases, and thus roll-off is suppressed.

<1.0-3.0 Peak Roll-Off>

As shown in FIG. 1, two points on the surface of the substrate that are 1.0 mm and 3.0 mm away from the outermost edge of the substrate are identified as A and B, respectively. Then, a line joining the two points A and B is identified as a base line. When a line at right angles to the base line is drawn from the base line to the surface of the substrate, the length of this line is measured as a distance between the base line and the substrate surface, and the longest distance is determined as 1.0-3.0 Peak roll-off (nm).

<Measurement Conditions>

Measuring device: New View 5032 manufactured by Zygo Corporation
Lens: 2.5×
Zoom: 0.5×
Analysis software: Zygo Metro Pro (manufactured by Zygo Corporation)

TABLE 5

| | | Silica particles | | | | Alumina particles | | | | | |
|---|---|---|---|---|---|---|---|---|---|---|---|
| | | Volume median diameter (nm) | Number-basis standard deviation | Volume fraction (%) | | | Volume median diameter (μm) | | Alumina/Silica (weight ratio) | Embedding (relative value) | Polishing rate (μm/min) | Waviness Wa (Å) |
| | | | | 20-40 nm | 60-80 nm | 100-120 nm | α alumina | θ alumina | | | | |
| Examples | 1 | 83.0 | 23.9 | 8 | 26 | 19 | 0.30 | — | 25/75 | 3 | 0.370 | 1.92 |
| | 2 | 45.4 | 11.0 | 41 | 22 | 0 | | | | 2 | 0.396 | 1.93 |
| | 3 | 43.7 | 12.6 | 38 | 23 | 1 | | | | 2 | 0.401 | 2.02 |
| | 4 | 102.4 | 23.5 | 3 | 22 | 17 | | | | 5 | 0.412 | 2.11 |
| | 5 | 91.1 | 20.5 | 13 | 7 | 11 | | | | 4 | 0.416 | 2.15 |
| | 6 | 62.2 | 15.6 | 17 | 11 | 4 | | | | 3 | 0.393 | 1.94 |
| | 7 | 82.6 | 20.1 | 12 | 12 | 15 | | | | 3 | 0.437 | 2.03 |
| | 8 | 68.8 | 19.1 | 11 | 26 | 11 | | | | 4 | 0.456 | 2.04 |

TABLE 5-continued

| | | Silica particles | | | | | Alumina particles | | | | | |
|---|---|---|---|---|---|---|---|---|---|---|---|---|
| | | Volume median diameter (nm) | Number-basis standard deviation | Volume fraction (%) | | | Volume median diameter (μm) | | Alumina/Silica (weight ratio) | Embedding (relative value) | Polishing rate (μm/min) | Waviness Wa (Å) |
| | | | | 20-40 nm | 60-80 nm | 100-120 nm | α alumina | θ alumina | | | | |
| | 9 | 73.6 | 21.2 | 4 | 42 | 9 | | | | 3 | 0.453 | 2.05 |
| | 10 | 73.6 | 21.2 | 4 | 42 | 9 | | | | 3 | 0.479 | 2.17 |
| | 11 | 73.6 | 21.2 | 4 | 42 | 9 | | 0.16 | | 1 | 0.499 | 2.20 |
| | 12 | 74.4 | 14.5 | 24 | 40 | 3 | | — | | 2 | 0.422 | 2.05 |
| | 13 | 71.4 | 17.4 | 5 | 40 | 4 | | | | 3 | 0.410 | 2.12 |
| | 14 | 72.4 | 23.4 | 3 | 77 | 2 | | | | 2 | 0.602 | 2.01 |
| | 15 | 70.4 | 22.7 | 4 | 74 | 5 | | | | 3 | 0.621 | 2.04 |
| | 16 | 68.8 | 16.6 | 16 | 55 | 2 | | | | 2 | 0.633 | 2.06 |
| | 17 | 64.3 | 19.3 | 12 | 56 | 5 | | | | 1 | 0.531 | 1.84 |
| | 18 | 64.3 | 19.3 | 12 | 56 | 5 | | | | 2 | 0.654 | 1.99 |
| | 19 | 64.3 | 19.3 | 12 | 56 | 5 | | 0.16 | | 2 | 0.594 | 1.95 |
| | 20 | 68.8 | 11.4 | 0.2 | 76 | 2 | | | | 4 | 0.632 | 2.22 |
| Comparative Examples | 1 | 13.4 | 2.4 | 4 | 0 | 0 | 0.30 | — | 25/75 | 34 | 0.180 | 1.97 |
| | 2 | 24.2 | 3.8 | 92 | 0 | 0 | | | 25/75 | 34 | 0.171 | 2.05 |
| | 3 | 36.2 | 7.2 | 84 | 0 | 0 | | | 25/75 | 27 | 0.227 | 2.25 |
| | 4 | 38.5 | 6.4 | 53 | 0 | 0 | | | 25/75 | 18 | 0.363 | 2.31 |
| | 5 | 53.5 | 6.7 | 0 | 10 | 0 | | | 25/75 | 18 | 0.413 | 2.41 |
| | 6 | 103.4 | 5.8 | 0 | 0 | 71 | | | 25/75 | 12 | 0.435 | 2.77 |
| | 7 | 26.1 | 5.6 | 9 | 0 | 0 | | | 25/75 | 25 | 0.161 | 1.79 |
| | 8 | 52.5 | 10.5 | 1 | 33 | 0 | | | 25/75 | 15 | 0.433 | 2.53 |
| | 9 | 15.0 | 3.2 | 13 | 0 | 0 | | | 25/75 | 24 | 0.192 | 1.94 |
| | 10 | 22.5 | 4.1 | 61 | 0 | 0 | | | 25/75 | 20 | 0.215 | 1.92 |
| | 11 | 37.6 | 8.5 | 33 | 4 | 0 | | | 25/75 | 18 | 0.244 | 1.89 |
| | 12 | 68.6 | 8.0 | 0 | 81 | 0 | | | 25/75 | 13 | 0.447 | 2.34 |

TABLE 6

| | | Silica particles | | | | | Alumina particles | | | | | |
|---|---|---|---|---|---|---|---|---|---|---|---|---|
| | | Volume median diameter (nm) | Number-basis standard deviation | Volume fraction (%) | | | Volume median diameter (μm) | | Alumina/Silica (weight ratio) | Embedding (relative value) | Polishing rate (μm/min) | Waviness Wa (Å) |
| | | | | 20-40 nm | 60-80 nm | 100-120 nm | α alumina | θ alumina | | | | |
| Examples | 27 | 73.6 | 21.2 | 4 | 42 | 9 | 0.30 | — | 50/50 | 10 | 0.501 | 2.53 |
| | 28 | | | | | | | | 10/90 | 2 | 0.366 | 1.92 |
| Comparative Example | 13 | — | — | — | — | — | 0.30 | — | 100/0 | 35 | 0.464 | 3.45 |

TABLE 7

| | | Silica particles | | | | | Alumina particles | | | | | |
|---|---|---|---|---|---|---|---|---|---|---|---|---|
| | | Volume median diameter (nm) | Number-basis standard deviation | Volume fraction (%) | | | Volume median diameter (μm) | | Alumina/Silica (weight ratio) | Embedding (relative value) | Polishing rate (μm/min) | Waviness Wa (Å) |
| | | | | 20-40 nm | 60-80 nm | 100-120 nm | α alumina | θ alumina | | | | |
| Examples | 29 | 73.6 | 21.2 | 4 | 42 | 9 | 0.60 | 0.16 | 50/50 | 30 | 1.016 | 3.40 |
| | 30 | | | | | | | | 30/70 | 18 | 0.921 | 3.12 |
| | 31 | | | | | | | | 25/75 | 15 | 0.828 | 3.10 |
| | 32 | | | | | | | | 20/80 | 11 | 0.796 | 3.10 |
| | 33 | | | | | | | | 10/90 | 5 | 0.661 | 2.76 |
| Comparative Examples | 14 | — | — | — | — | — | 0.60 | 0.16 | 100/0 | 100 | 1.035 | 3.68 |

TABLE 8

| | | Silica particles | | | | | Alumina particles Volume median diameter (μm) | | Alumina/ Silica | Embedding | Polishing rate | Waviness | 1.0-3.0 Peak |
| | | Volume median diameter (nm) | Number-basis standard deviation | Volume fraction (%) | | | α alumina | θ alumina | (weight ratio) | (relative value) | (μm/min) | Wa (Å) | roll-off (nm) |
| | | | | 20-40 nm | 60-80 nm | 100-120 nm | | | | | | | |
|---|---|---|---|---|---|---|---|---|---|---|---|---|---|
| Reference Example | 18 | 64.3 | 19.3 | 12 | 56 | 5 | 0.30 | 0.16 | 25/75 | 2 | 0.654 | 1.99 | 8.71 |
| Examples | 21 | 64.3 | 19.3 | 12 | 56 | 5 | 0.30 | 0.16 | 25/75 | 1 | 0.655 | 2.10 | 5.99 |
| | 22 | | | | | | | | | 2 | 0.651 | 2.10 | 4.40 |
| | 23 | | | | | | | | | 2 | 0.652 | 2.11 | 2.96 |
| | 24 | | | | | | | | | 1 | 0.648 | 2.04 | 2.68 |
| | 25 | | | | | | | | | 2 | 0.641 | 2.09 | 5.28 |
| | 26 | | | | | | | | | 2 | 0.645 | 2.08 | 2.64 |

As shown in Tables 5 to 8, when the polishing compositions of Examples 1 to 33 are used, it is evident that the embedding of the abrasive particles into the substrate can be significantly reduced as compared to the polishing compositions of Comparative Examples 1 to 14. As shown in Table 8, the polishing compositions of Examples 21 to 26, each of which contains a predetermined copolymer, can reduce the roll-off without worsening the embedding, the polishing rate, and the waviness.

Next, the following experiments were conducted to evaluate the effects of the polishing composition and the polishing pressure on the polishing rate and the waviness of the substrate after polishing.

4. Preparation of Polishing Composition

Alumina particles, colloidal silica, a maleic acid, a citric acid, a sulfuric acid (98% product), and water were mixed as shown in Table 9, and the polishing compositions of Experimental Examples 1 to 14 were prepared. The volume median diameters of the primary particles and the secondary particles of the α-alumina were 0.10 μm and 0.30 μm, respectively. The volume median diameters of the primary particles and the secondary particles of the θ-alumina were 0.03 μm and 0.16 μm, respectively. Moreover, the volume median diameters of the primary particles of the colloidal silica whose standard deviation in number-basis particle size was 12.6 nm and 10.5 nm were both 0.05 μm.

The particle size of the secondary particles of the alumina particles and the particle size distribution, the volume median diameter, and the standard deviation in the particle size of the silica particles were measured in the same manner as described above.

5. Polishing of Substrate

The substrates to be polished were polished with the polishing compositions prepared in Experimental Examples 1 to 14. The substrates to be polished as described in item 2 were used. The polishing conditions were the same as those in item 2 except that the polishing pressure was set to the values shown in Table 9.

6. Evaluation Method

The polishing rate and the waviness of the substrate surface after polishing were evaluated with each of the polishing compositions of Experimental Examples 1 to 14. Table 9 shows the results as a relative value when the value obtained by using the polishing composition of Experimental Example 10 is identified as 1. The polishing rate and the waviness were evaluated in the same manner as described in item 3.

TABLE 9

| | Polishing composition | | | | | | | | Evaluation results | |
| | Alumina particles | | Silica particles | | | Acids | | | | Polishing |
| | α alumina $D_{50}$ = 0.3 μm (wt %) | θ alumina $D_{50}$ = 0.16 μm (wt %) | Standard deviation 12.6 nm (wt %) | Standard deviation 10.5 nm (wt %) | Alumina/ Silica | Organic acid 0.5 wt % | Inorganic acid 0.4 wt % | Polishing pressure (kPa) | Waviness (relative value) | rate (relative value) |
|---|---|---|---|---|---|---|---|---|---|---|
| Experimental Example 1 | 0.96 | — | 2.88 | — | 25/75 | Citric acid | Sulfuric acid | 11.8 | 1.00 | 1.25 |
| Experimental Example 2 | | | | | | | | 12.7 | 1.01 | 1.26 |
| Experimental Example 3 | | | | | | | | 14.7 | 1.01 | 1.34 |
| Experimental Example 4 | | | | | | | | 16.6 | 1.02 | 1.34 |
| Experimental Example 5 | 0.96 | — | 2.88 | — | 25/75 | Maleic acid | Sulfuric acid | 11.8 | 0.97 | 1.28 |
| Experimental Example 6 | 2.30 | — | 1.54 | — | 60/40 | Citric acid | Sulfuric acid | 11.8 | 1.19 | 1.48 |
| Experimental Example 7 | 0.58 | — | 3.26 | — | 15/85 | Citric acid | Sulfuric acid | 11.8 | 0.93 | 1.14 |
| Experimental Example 8 | 0.96 | — | 2.88 | — | 25/75 | Citric acid | — | 11.8 | 0.96 | 1.08 |
| Experimental Example 9 | 0.58 | 0.38 | 2.88 | — | 25/75 | Citric acid | Sulfuric acid | 11.8 | 1.09 | 1.34 |

TABLE 9-continued

| | Polishing composition | | | | | | | | Evaluation results | |
|---|---|---|---|---|---|---|---|---|---|---|
| | Alumina particles | | Silica particles | | | | | | | |
| | α alumina | θ alumina | Standard | Standard | | Acids | | | | Polishing |
| | $D_{50}=$ 0.3 μm (wt %) | $D_{50}=$ 0.16 μm (wt %) | deviation 12.6 nm (wt %) | deviation 10.5 nm (wt %) | Alumina/ Silica | Organic acid 0.5 wt % | Inorganic acid 0.4 wt % | Polishing pressure (kPa) | Waviness (relative value) | rate (relative value) |
| Experimental Example 10 | 0.96 | — | 2.88 | — | 25/75 | Citric acid | Sulfuric acid | 10.0 | 1.00 | 1.00 |
| Experimental Example 11 | | | | | | Citric acid | Sulfuric acid | 17.6 | 1.31 | 1.34 |
| Experimental Example 12 | 3.84 | — | — | — | 100/0 | Citric acid | Sulfuric acid | 11.8 | 2.28 | 1.18 |
| Experimental Example 13 | — | — | 3.84 | — | 0/100 | Citric acid | Sulfuric acid | 11.8 | 0.51 | 0.20 |
| Experimental Example 14 | 0.96 | — | — | 2.28 | 25/75 | Citric acid | Sulfuric acid | 11.8 | 1.32 | 1.18 |

As shown in Table 9, the polishing compositions of Experimental Examples 1 to 9 combined with their respective polishing pressures can reduce the waviness of the substrate surface and also can improve the polishing rate.

As described above, the present invention can provide, e.g., a hard disk substrate suitable for high recording density.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polishing composition for a hard disk substrate comprising:
    alumina particles;
    silica particles;
    water;
    an acid and/or its salt;
    and an oxidizing agent;
    wherein a volume median diameter of secondary particles of the alumina particles measured by a laser beam diffraction method is 0.1 to 0.8 μm,
    a volume median diameter of primary particles of the silica particles measured by transmission electron microscope observation is 45 to 100 nm,
    a standard deviation in number-basis particle size of the primary particles of the silica particles measured by the transmission electron microscope observation is 11 to 25 nm,
    the silica particles include silica particles with a particle size of 20 to 120 nm in an amount of 40% or more by volume of a total amount of the silica particles, silica particles with a particle size of 20 to 40 nm in an amount of 1 to 30% by volume of the total amount of the silica particles, silica particles with a particle size of 60 to 80 nm in an amount of 10 to 77% by volume of the total amount of the silica particles, and silica particles with a particle size of 100 to 120 nm in an amount of 0 to 30% by volume of the total amount of the silica particles,
    wherein the volume percentage of the silica particles with a particle size of 60 to 80 nm is the largest among the volume percentages of the particle size ranges of 20 to 40 nm, 60 to 80 nm, and 100 to 120 nm,
    wherein the polishing composition further comprises a copolymer and/or its salt having a constitutional unit expressed as the following formula (I) and a constitutional unit derived from a hydrophobic monomer whose solubility in 100 g of water at 20° C. is 2 g or less;

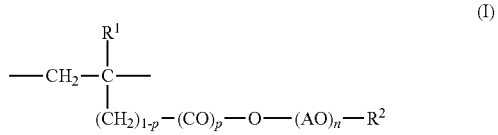

wherein the formula (I). $R^1$ is a hydrogen atom or a methyl group, $R^2$ is a hydrogen atom or a $C_1$ to $C_4$ alkyl group, AO is a $C_2$ to $C_8$ oxyalkylene group, p is 0 or 1, n is a total average number of mols of AO added and ranges from 9 to 250, and the proportion of an oxyethylene group in $(AO)_n$ is 80 mol% or more, and wherein pH of the composition is less than 7.

2. The polishing composition according to claim 1, wherein the alumina particles include α-alumina.

3. The polishing composition according to claim 1, wherein the silica particles are colloidal silica.

4. The polishing composition according to claim 1, wherein a weight ratio of the alumina particles to the silica particles (alumina particle weight/silica particle weight) is in the range of 60/40 to 10/90.

5. The polishing composition according to claim 1, wherein the silica particles are obtained by mixing two or more types of silica particles having different particle size distributions.

6. The polishing composition according to claim 1, wherein the alumina particles further include intermediate alumina.

7. A method for manufacturing a hard disk substrate comprising: polishing a substrate to be polished with the polishing composition according to claim 1, wherein a polishing pressure during the polishing is 10.3 to 16.7 kPa.

8. The method for manufacturing a hard disk substrate according to claim 7, wherein the hard disk substrate is used for a perpendicular magnetic recording system.

9. A method for polishing a substrate to be polished comprising:

polishing the substrate to be polished with the polishing composition according to claim 1, wherein the substrate to be polished is used for manufacturing a hard disk substrate for a perpendicular magnetic recording system, a polishing pressure during the polishing is 10.3 to 16.7 kPa, and the polishing process is a rough polishing process.

* * * * *